Patented July 28, 1942

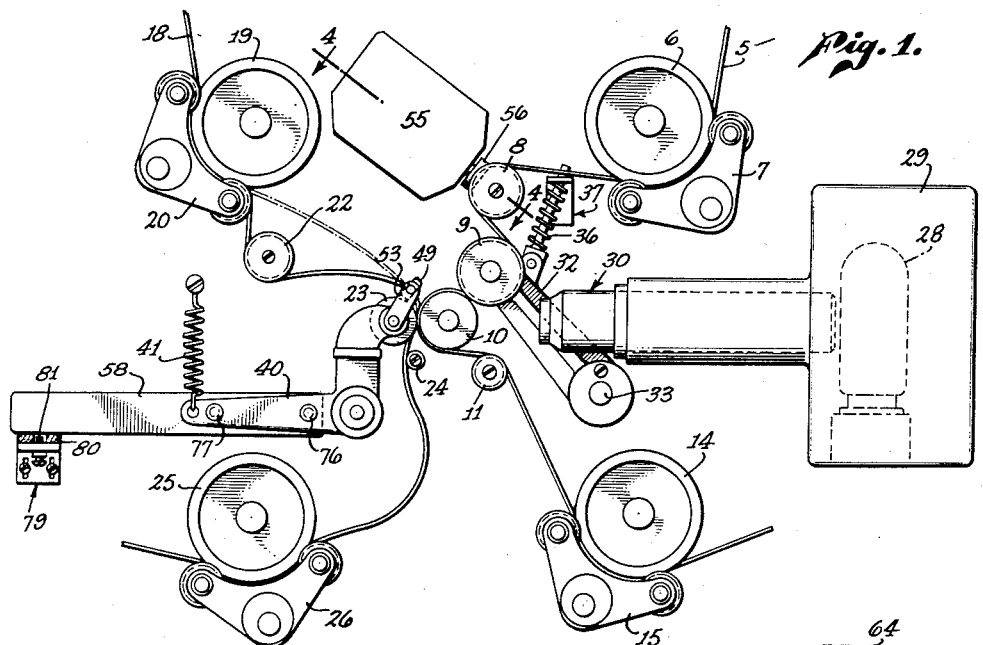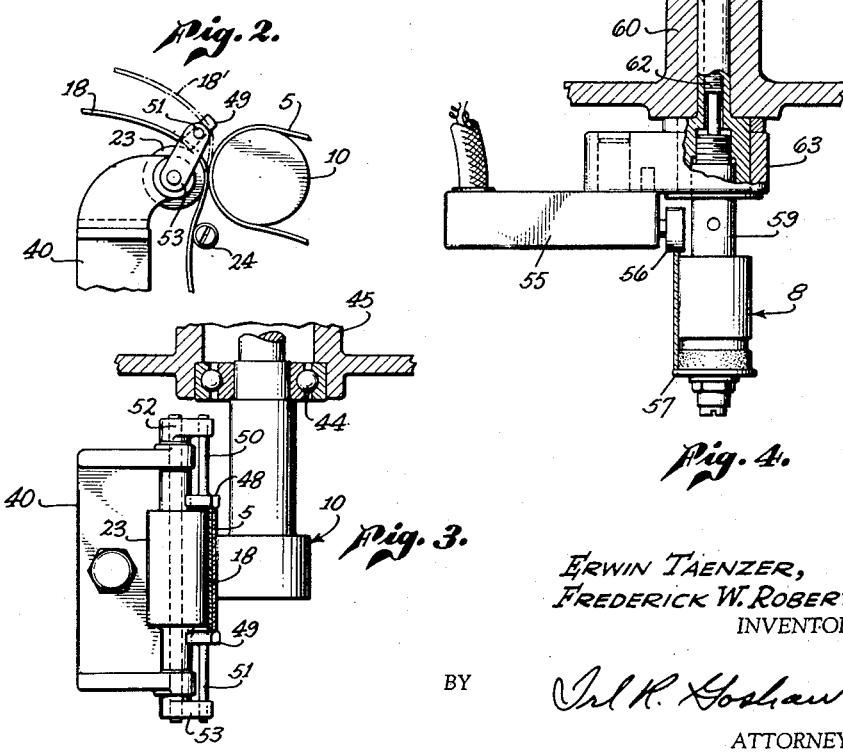

2,290,919

UNITED STATES PATENT OFFICE 2,290,919

FILM PRINTER DRIVE

Erwin Taenzer, Brooklyn, and Frederick W. Roberts, Rosedale, N. Y., assignors to Warner Brothers Pictures, Inc., a corporation of Delaware Application March 30, 1940, Serial No. 326,942

9 Claims. (Cl. 95—75)

This invention relates to motion picture apparatus and particularly to printers for motion picture film wherein the negative and positive raw stock are advanced in contact past a light beam projected through the negative to the positive.

The present invention relates to printers of the "non-slip" type, such as disclosed in E. W. Kellogg U. S. Patent 1,783,045, of November 25, 1930, wherein the films are given a curvature as they pass the printing point in accordance with the difference in length between the negative and positive. The principle enunciated in the Kellogg patent is that if the films are provided with the proper curvature, there will be no slipping of the films with respect to one another as would otherwise occur. The curvature may be only in one film, the variation being in accordance with the difference in unit lengths of each film between perforations.

It is well known that after a film has been developed, a certain amount of shrinkage occurs therein, and as the film ages, the shrinkage generally increases. Also, films developed at the same time may shrink different amounts for other reasons. Thus, if a piece of negative film and a piece of positive film were laid end to end, each film having the same number of perforations, the negative film would be shorter than the raw positive stock. In printing from a negative to a positive wherein the negative reel is made up of a series of negative strips developed at different times, the degree of shrinkage will generally vary throughout the reel according to the difference in age of the various negative strips. By printing with a "non-slip" printer, however, the printer will automatically compensate for the different degrees of shrinkage as the films pass in contact with one another past the light translation or printing point. In order for the printer to function satisfactorily, each of the films must be properly guided before and at the translation point. Provision must also be made for adequately providing for the change of curvature as the reel changes from a negative strip of one shrinkage to a negative strip of a different shrinkage.

In the use of "non-slip" printers, the negative is usually spliced and the passing of such splices at the translation point can introduce considerable distortion on the print on both sides of the splice position. The present invention reduces such splice effects to a minimum.

The present invention is directed to an improvement in the "non-slip" film printer, the principal object of the invention being to improve and facilitate the printing with a minimum amount of distortion, a reel of negative strips of different shrinkages to positive raw stock.

Another object of the invention is to obtain improved guiding and stabilization of the films at the printing point.

A further object of the invention is to prevent sprocket and other sources of film speed variations from affecting the film at the printing point.

A further object of the invention is to prevent irregularities in the thickness of a film, such as splices, from introducing distortion about the point of irregularity during printing.

Although the novel features which are believed to be characteristic of this invention are pointed out with particularity in the claims appended herewith, the manner of its organization and the mode of its operation will be better understood by referring to the following description read in conjunction with the accompanying drawing forming a part thereof in which Fig. 1 is an elevational view embodying the invention;

Fig. 2 is a detail view at the printing point of the printer of Fig. 1;

Fig. 3 is a plan view of the details shown in Fig. 2; and

Fig. 4 is a partial cross-sectional view of a guide roller and circuit interrupter taken along the line 4—4 of Fig. 1.

Referring now to Fig. 1, a negative film 5 is fed by a sprocket 6 having a pad roller 7 associated therewith to a circuit interrupter roller 8, from whence it passes around a pressure roller 9, a printing roller 10, and then over guide roller 11 to a feed sprocket 14 having a pad roller 15 associated therewith. The negative film is supplied from a supply reel and is taken up by a takeup reel, not shown.

A positive film 18 is fed to the printing point by a sprocket 19 having a pad roller 20 associated therewith. The film may be fed either around a guide roller 22, as shown by the solid lines, or directly from sprocket 19 to the roller 23, as shown by the dotted lines, roller 23 maintaining the positive in contact with the negative on the roller 10. The use of roller 22 provides a somewhat softer loop above the printing aperture. The positive then passes around a guide roller 24 to a sprocket 25 having a pad roller 26 associated therewith. The supply and takeup reels for the positive film are not shown. The printer light is supplied from a lamp 28 in a housing 29 through an optical projection system 30. The pressure roller 9 is mounted on a bracket 32, pivoted at 33, and maintained at a definite pressure by spring 36 mounted on a toggle bracket 37.

Pressure on the two films at the printing point is obtained by the roller 23 mounted on an L bracket 40 under tension of a spring 41. The bracket 40 is mounted on an extension 58, a pivot point being provided at 76 and a retractable pin at 77. When the pin 77 is retracted, the bracket 40 may be rotated to remove the roller 23 from roller 10 to permit the threading of the film. The other end of the extension 58 bears upon a block 79 which has mounted on it a piece of rubber or felt or other resilient material 80 and an adjustable stop 81. The stop 81 is preferably adjusted so that the roller 23 can open only the thickness of four pieces of film (corresponding to a positive and negative splice passing the translation point at the same time). The rubber or felt acts as a limit spring and damping medium which reacts as soon as the bracket tends to open under the influence of a splice. Under normal operation, spring 41 supplies the tension, but as soon as bracket 40 opens, the rubber or felt 80 goes into action.

Figs. 2 and 3 show the details of the mechanism for maintaining the films in contact and for permitting the positive film loop to be properly guided while varying in size. The roller 10 is mounted upon a bearing 44 in a frame plate 45. As the negative film strips of varying amounts of shrinkage pass the printing point, the positive film between the rollers 22 and 23 will produce different-sized loops according to the shrinkage variations in the negative. It has been found that the stiffness of the film will cause the positive to assume the correct entering curve as shown by the dotted lines 18' in Fig. 2 illustrating a certain maximum shrinkage condition, while the film positive 18 may be considered as a minimum shrinkage condition. The film is aided in forming the proper loop by the roller 24 immediately below the printing point.

To enable the film to be properly guided as it assumes the various entering curves as the loop size changes, the film is guided by a pair of curved, elongated carbaloy guide shoes 48 and 49 mounted upon rods 50 and 51 attached to arms 52 and 53, respectively. These shoes may also be of other hard material such as sapphire or even diamond. The edges of the positive film may freely slide over the curved edges of the shoes while being accurately guided between them as the film approaches the printing point. Another purpose of the roller 24 below the printing point is to eliminate the transmission of flutter from the sprocket 19 to the printing point in case the loop between the rollers 22 and 23 becomes very small and the film a bit taut. In prior arrangements, a roller under spring tension has been used in the film loop between the rollers 22 and 23 to provide a certain predetermined tautness in the film as it approaches the printing point. In the present design, however, the positive film forms a particularly soft loop ahead of the printing point and thus prevents flutter from being transmitted to the printing point.

In a printer of this type, accurate guiding of both films is, of course, essential and it is necessary that the negative as well as the positive film be accurately guided. The positive film is guided at the printing point by the curved carbaloy shoes, as shown in Fig. 3, while the negative film is guided as it approaches the printing point by the flanges on pressure roller 9. There is also a flange 57 provided on roller 8 to guide one edge of the film as it is pressed by the roller 56 of the circuit interrupter 55 (see Fig. 4). As is well known, this interrupter is operated by film notches to control the printer light intensity. However, should the flange of roller 8 not be in the same plane as the appropriate flange of roller 9, a twisting action and weaving of the negative will result. To easily adjust the flange 57 of the roller 8 with respect to the same guiding flange of roller 9, the roller 8 has been mounted on a longitudinally adjustable shaft 59. The shaft 59 is threaded into the interrupter support 63 mounted on the frame 60. A threaded adjusting shaft 62 with slotted head 64 is within the bored stud 65, the entire assembly being held in position by nut 61. Thus, the roller 8 may be easily adjusted so that the plane of its guidance flange coincides with the plane of the guidance flange of the negative pressure roller 9.

We claim as our invention:

1. A contact film printer comprising means for moving a plurality of films having different degrees of shrinkage in contact with each other past an exposing light, means for maintaining one of said films in a definite curved path at the light exposing point, means for maintaining said films in contact with one another, means mounted on said last-mentioned means, for transversely guiding a variable loop in said other film adjacent said light exposing point at which said film approaches said light exposing point, and means for fixedly determining a loop on the other side of said light exposing point.

2. A contact film printer comprising means for moving a plurality of films having different degrees of shrinkage in contact with each other past an exposing light, means for maintaining one of said films in a definite curved path at the light exposing point, a plurality of edge-guiding rollers for one of said films as it approaches said light exposing point, one of said rollers being adjustable for causing the edge-guiding flange thereof to lie in a plane parallel with the plane of said said second edge-guiding roller, means for positioning the surface of the other of said films, and means for guiding said other of said films at said light exposing point as it varies in curvature at said light exposing point, said last-mentioned means comprising elongated members mounted on said surface positioning means and extending over the point of contact between said films, said last-mentioned means being adjacent said light exposing point and maintaining the same amount of contact with the edges of the film regardless of the variations in curvature of said film as it approaches said exposing point.

3. In a contact film printer, means for maintaining contact of a plurality of films as they pass an exposing light, means for fixedly positioning the surface of both of said films along the line of contact thereof, a plurality of means for edge-guiding one of said films as it approaches said line of contact, one of said edge-guiding means being adjustable to coincide with the other of said edge-guiding means, means for increasing the loop in the other of said films as it approaches the line of contact between said films, and stationary means mounted on said surface positioning means for transversely guiding the film in said loop as the size of said loop varies as it approachs said line of contact, said film passing said guiding means at substantially a right angle regardless of the size of said loop, and means for forming said film in a loop after it leaves said light exposing point, said transverse loop guiding means comprising a pair of elongated guide shoes adjacent said line of contact of said films, said film being similarly guided as the angle of approach of said film to said line of contact varies, said shoes being curved to provide contact with the edges of said film.

4. In a contact film printer the combination of means for advancing a pair of films, a roller around which one of said films passes, a second roller adapted to maintain said other film in contact with said first film while in contact with said first roller, means for mounting said second roller to permit damped movement thereof a predetermined distance away from said second roller, and a pair of elongated guide members mounted on said last-mentioned means at the mounting point of said second roller for guiding said other film as it approaches said first film, said members being positioned at such an angle that the film passes said members at right angles thereto regardless of the position of said film prior to said contact point.

5. A contact film printer comprising means for advancing a pair of films, a first roller around which one of said films passes, a second roller for positioning the surface of said other film in contact with said first film as said first film passes over said first roller, a pivoted bracket member on which said second roller is mounted, said bracket member permitting damped movement of said second roller away from said first roller a predetermined amount, said means including resilient means for urging said second roller toward said first roller, and film guiding members mounted on said bracket at the ends of said second roller.

6. A contact film printer in accordance with claim 1 in which said transverse guiding means comprises a pair of elongated members adjacent the entrance of said films to said light exposing point and having a convex curvature toward said film and adapted to permit said other film to move longitudinally along said members.

7. In a contact film printer, the combination of means for moving a plurality of films in contact with each other past an exposing light, means for maintaining one of said films in a definite curved path at the light exposing point, means for maintaining said films in contact with one another, means for varying the size of the loop in said other film as it approaches said light exposing point in accordance with the shrinkage in said film, and means for transversely guiding said other film in said loop as said loop varies in size, said last-mentioned means maintaining substantially the same area of contact between said means and said film regardless of the size of said loop.

8. A contact film printer in accordance with claim 7 in which said guiding means comprises a pair of elongated carbaloy shoes adjacent said light exposing point and between which said film and said loop passes as it approaches said light exposing point.

9. In a contact film printer, means for maintaining contact between a plurality of films as they pass an exposing light, means for fixedly positioning the surface of both of said films along the line of contact thereof, a plurality of means for edge-guiding one of said films as it approaches said line of contact, means for varying a loop in the other of said films as it approaches the line of contact between said films, and means positioned adjacent said line of contact between said films for transversely guiding the film in said loop as the size of the loop varies as it approaches said line of contact, said guiding means maintaining the same area of contact between said means and said film for all sizes of said loop as said film passes said guiding means in substantially a right angle relationship.

ERWIN TAENZER.
FREDERICK W. ROBERTS.